United States Patent [19]

Byrd

[11] Patent Number: 5,377,074
[45] Date of Patent: Dec. 27, 1994

[54] UTILITY METER MOUNTING PEDESTAL

[76] Inventor: Jerry D. Byrd, 6722 19-½ Mile Rd., Sterling Heights, Mich. 48078

[21] Appl. No.: 201,421

[22] Filed: Feb. 24, 1994

[51] Int. Cl.⁵ .............................................. H02B 1/04
[52] U.S. Cl. ...................................... 361/664; 174/38; 248/156; 248/231.91
[58] Field of Search .................... 52/165, 298; 174/37, 174/38, 45 R, 51; 248/156, 49, 231.91; 361/664–667, 829, 825

[56] References Cited

U.S. PATENT DOCUMENTS

| | | | |
|---|---|---|---|
| 3,868,080 | 2/1975 | Olson | 174/38 |
| 3,879,641 | 4/1975 | Byrd | 361/664 |
| 4,076,198 | 2/1978 | Garrett | 174/38 |
| 4,751,610 | 6/1988 | Nickola | 361/664 |
| 4,833,566 | 5/1989 | Nickola | 361/664 |
| 4,852,834 | 8/1989 | Hosman | 248/156 |
| 4,864,467 | 9/1989 | Byrd | 361/664 |
| 4,887,187 | 12/1989 | Nickola | 361/664 |

Primary Examiner—Gregory D. Thompson
Attorney, Agent, or Firm—Krass & Young

[57] ABSTRACT

An improved meter mounting pedestal for use in providing underground utility service, particularly electric service to a building construction site after a foundation has been constructed but before the building has been erected. The pedestal comprises a vertical post of planar configuration having a rolled side edge along one side and a flange along a portion of the side opposite the rolled side edge. A flat steel upper plate having a rolled side edge is secured near the upper end of the post with the rolled side edge of the plate being adjacent to and in an overlapping relationship with a rolled side edge of the post. A second plate is secured to the post near the lower end thereof and is mounted to the outside face of the building foundation. A foundation anchor strap is adjustably secured to the post between ends thereof are in mounted to an appropriate surface of the building foundation or floor joist.

10 Claims, 4 Drawing Sheets

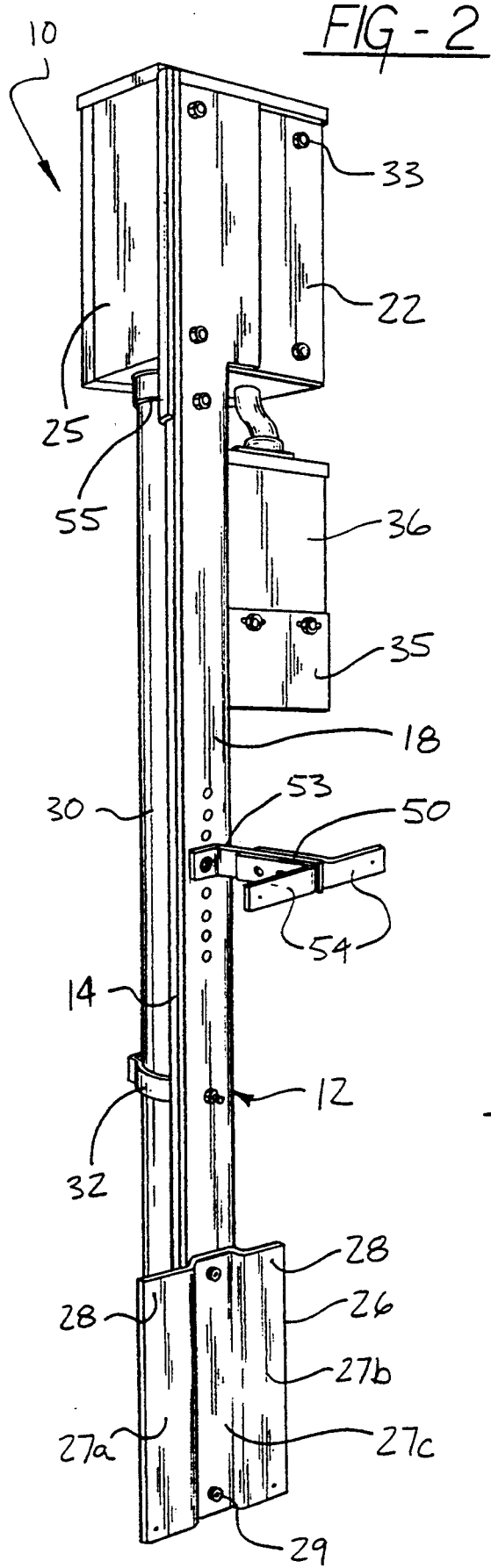
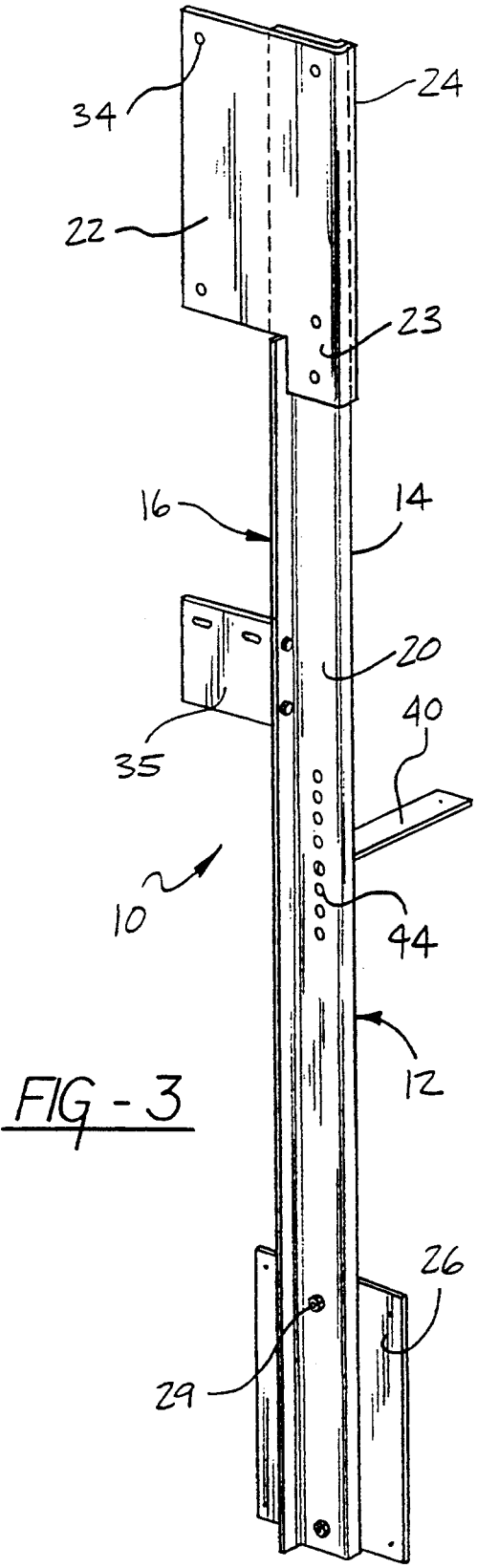

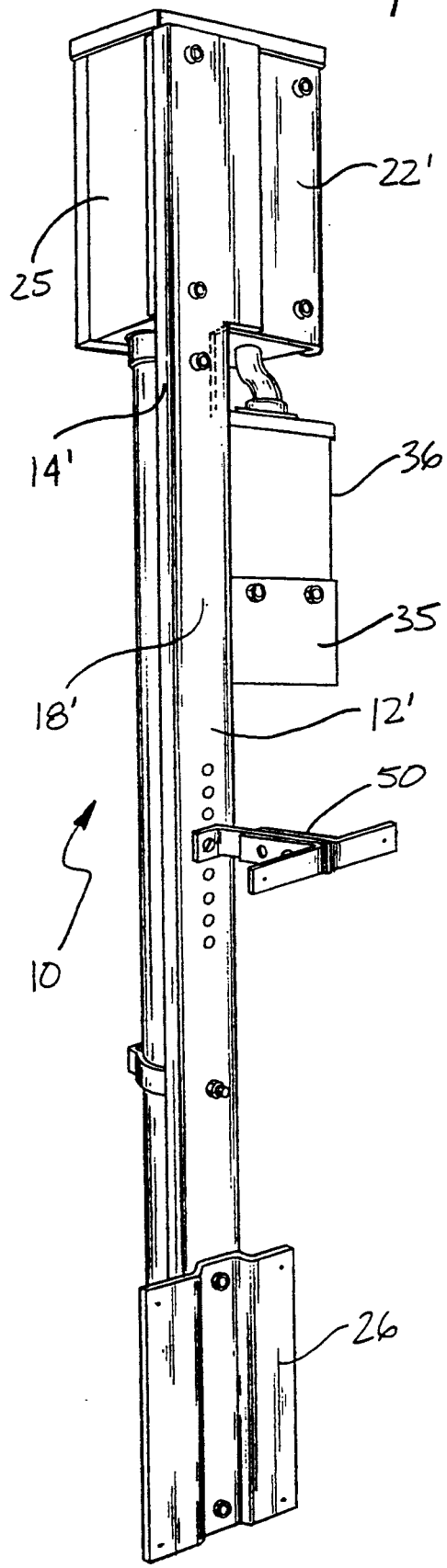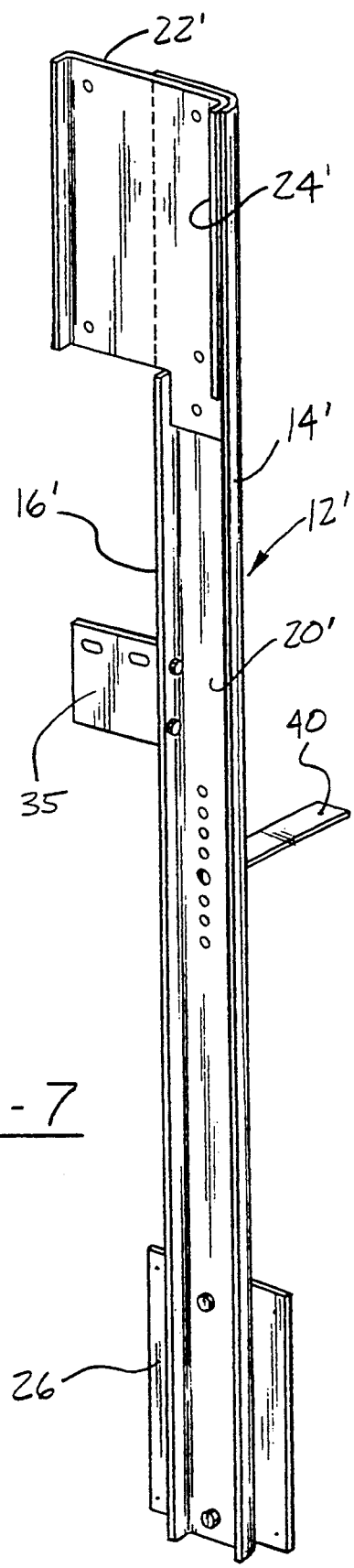

UTILITY METER MOUNTING PEDESTAL

FIELD OF THE INVENTION

This invention relates to mounting pedestals for utilities and more particularly to a mounting pedestal adapted to be secured to the outside face of a building foundation prior to the complete erection of the building thereon, such that underground utility service may be connected to a meter on said pedestal.

DESCRIPTION OF THE PRIOR ART

U.S. Pat. No. 4,864,467 issued Sep. 5, 1989 to Curtis W. Byrd et. al. and U.S. Pat. No. 3,879,641 issued Apr. 22, 1975 to Curtis W. Byrd disclose utility meter pedestals which are adapted to be mounted on a building foundation prior to the erection of a building on the foundation. The patents disclose the advantages of providing metered utility service, especially electrical power, at the building site during construction and providing a pedestal which neither interferes with the final construction nor requires removal and reinstallation of a meter once the building is completed.

U.S. Pat. No. 3,879,641 discloses two different pedestals, both comprising vertical posts in the form of relatively wide steel plates having parallel edge flanges, the bottoms of which are adapted to rest on a brick ledge. In one embodiment, the meter box is fastened to a small seat bracket which extends forwardly at right angles to the post plate and at the top of the post plate; i.e., the meter mounting block sits on top of this bracket and is preferably secured thereto by threaded fasteners or rivets.

U.S. Pat. No. 3,879,641 also discloses a strap which is secured to the pedestal post between the ends thereof and which is adapted to overlie the top and inside surfaces of the building foundation to assist in the proper positioning and securement of the pedestal post to the foundation during installation and construction phases.

U.S. Pat. No. 4,864,467 discloses a utility pedestal comprising a vertical L channel post having flat steel upper and lower plates secured to the post at opposite ends thereof. The upper plate carries a utility meter box and the lower plate is secured to the building foundation. A strap is also adjustably secured to the post and anchored to the foundation in an overlying relationship.

BRIEF SUMMARY OF THE INVENTION

The present invention provides an improved utility meter pedestal which provides increased rigidity of the meter pedestal and meter box which in turn provides superior meter stability thereby increasing meter reliability. The pedestal includes a rigid elongated post of essentially planar configuration having an upper end and a lower end. The post has a rolled side edge along one side extending outwardly from and essentially perpendicular to the plane of the post. The side edge of the post opposite the rolled side edge is vertically bent 90° along at least a portion of the side forming a flange. The combination of the rolled side edge and opposite flanged side edge provides substantially increased post rigidity and stability. Thus, a substantially improved and more secure utility meter pedestal is provided.

A utility meter mounting plate is secured to the post near the upper end thereof. The utility meter mounting plate also has at least one rolled side edge, which when the plate is secured to the post, is adjacent to and in an overlapping or nesting relationship with the rolled side edge of the post. This overlapping rolled side edge relationship allows the meter mounting plate, and consequently a meter mounted thereon, to remain in a more secured, rigid and stable alignment with the post.

A steel plate is also secured to the post near the lower end thereof and adapted to be fastened, such as by power driven nails, to the outer face a building foundation. In addition, the apparatus includes an intermediate bracket which may comprise a rigid strap or bracket preferably securable to the rear surface of the metal post in any of several locations substantially between the upper and lower ends and extends rearwardly essentially perpendicular to the post. In the secured or installed condition, the strap may overlie the top of the foundation and is secured, preferably by power driven nails, to the top-of the foundation to permanently hold the meter pedestal post in place. Alternatively, a bracket may be secured to the back of the post between ends thereof and adapted to be attached to the outside face of the foundation or a floor joist.

The utility meter pedestal of the present invention also lends itself readily to the provision of temporary electrical utility services during the construction of a building on the foundation to which the utility meter pedestal post is attached. This is achieved through the installation of a third intermediate plate on to the flanged side of the post, which plate is adapted to receive a temporary outlet box which may be wired to the meter and to the electrical service to provide metered electricity during the construction phase of the building.

In the preferred embodiment the utility meter pedestal of the present invention readily accommodates both brick and siding construction and may be installed before or after erection of the building or the foundation has begun. At least in the case of brick, the bottom plate is secured to an exposed, below grade portion of the foundation which is also the brick ledge. In the case of siding, the bottom plate of the pedestal is preferably configured to space the rear leg of the pedestal post forwardly of the front face of the foundation by a sufficient distance to permit siding to be installed on the exterior building walls without undue interference from the utility meter post.

BRIEF DESCRIPTION OF THE DRAWINGS

FIG. 2 is a perspective view from the rear of a utility meter pedestal complete with meter box and temporary outlet box constructed in accordance with the invention;

FIG. 3 is a perspective view from the front of a utility meter pedestal but without the utility meter box, the temporary outlet box and the conduit;

FIG. 6 is a perspective view from the rear of another embodiment of a utility meter pedestal complete with meter box and temporary outlet box constructed in accordance with the invention; and FIGURE 7 is a perspective view from the front of the utility meter pedestal in FIG. 6 but without the utility meter box, the temporary outlet box and the conduit.

DESCRIPTION OF THE PREFERRED EMBODIMENT

Figure 1:
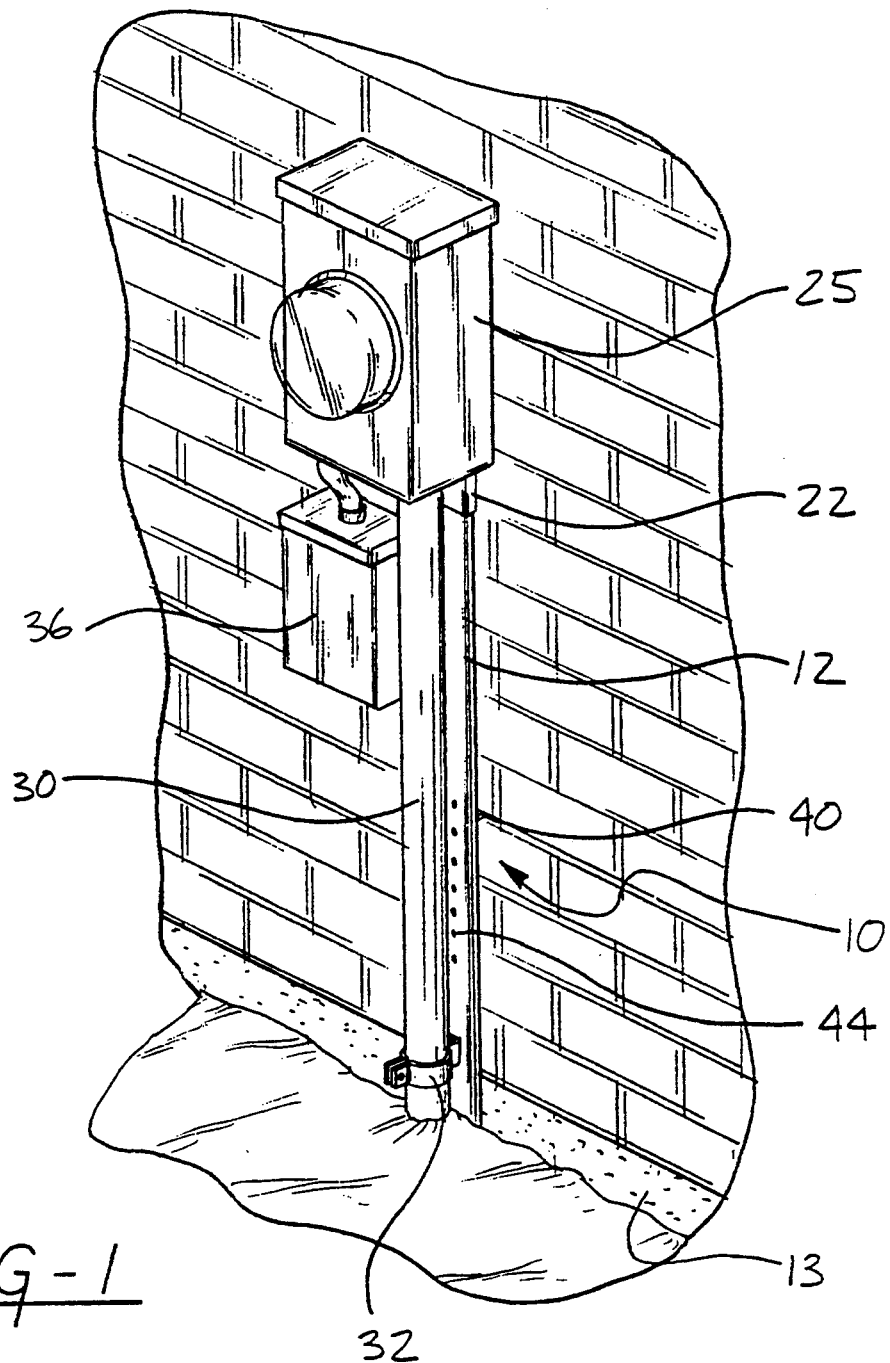
FIG. 1 is a perspective view of a utility meter pedestal which is constructed and installed on a finished building in accordance with the present invention.

Referring to FIG. 1, a utility meter pedestal 10 comprises a rigid steel elongated post 12 generally of a planar configuration and of sufficient length and width such that it may be secured to a building foundation 13 at a point which will be below ground and when the building is erected and extends upwardly above ground a sufficient distance to conveniently support a utility meter as more particularly described hereafter. Preferably post 12 is approximately six feet in length and extends approximately 42 inches above the surface of the ground when mounted to the building foundation. Post 12 is preferably of steel construction and is phosphated, galvanized, painted with rustproof paint or otherwise protected against rusting.

Referring to FIGS. 2 and 3 post 12 has a rolled side edge 14 and a flanged side edge 16 opposite the rolled side edge. In the illustrated embodiment the rolled edge 14 extends outwardly from and perpendicular to the rear face 18 of the post 12 and the flanged side edge 16 defines an included angle of 90° with the flanged side edge extending outwardly from the front face 20 of the post.

A meter mounting plate 22 is secured to the front face 20 of the post 12 at the upper end thereof. This is preferably achieved by trimming the flanged side edge 16 of post 12 near the upper end thereof as shown in FIG. 3 so that the plate 22 may be mounted flush against the front face of post 12 and the flanged side edge extends along the side thereof from the bottom of the post to a point just below the bottom of the meter mounting plate 22 as best shown in FIG. 3. The meter mounting plate 22 has at least one rolled side edge 24 which is adjacent to and overlaps the rolled side edge 14 of post 12 such that the rolled side edge 14 rigidly nests within rolled side edge 24. The meter mounting plate 22 further includes an extended portion 23 extending downwardly along the rolled side edges 14 and along and inside the flange 16. The extended portion 23 is preferably three inches in length. Plate 22 is preferably spot welded to post 12. A metal utility meter box 25 for a conventional utility meter is mounted to the plate 22. Conduit 30 extends from the underside of the meter box to a point below ground in parallel spaced relationship to post 12 and contains electric utility service wires which provide electric service to the meter. Conduit 30 is secured to post 12 by means of a clamp 32. An intermediate plate 35 is secured to the flange near the upper portion and a temporary electrical outlet box 36 is mounted on plate 35 and is electrically connected to the meter to provide metered electric service during the building construction. Thereafter the temporary outlet box may be removed.

An anchor plate 26 is secured to the post 12 near the lower end thereof and may be riveted, bolted or spot welded thereto. Plate 26 is preferably configured to provide flat mounting surfaces 27a and 27b which are rearwardly offset from the center portions 27c. Mounting surfaces 27a and 27b are mounted to the outside wall of the foundation causing post 12 to be spaced out from the foundation wall. Mounting plate 26 may be on the order of 10 to 14 inches in height and approximately 6 to 8 inches in width and is preferably made of galvanized steel.

Figure 5:
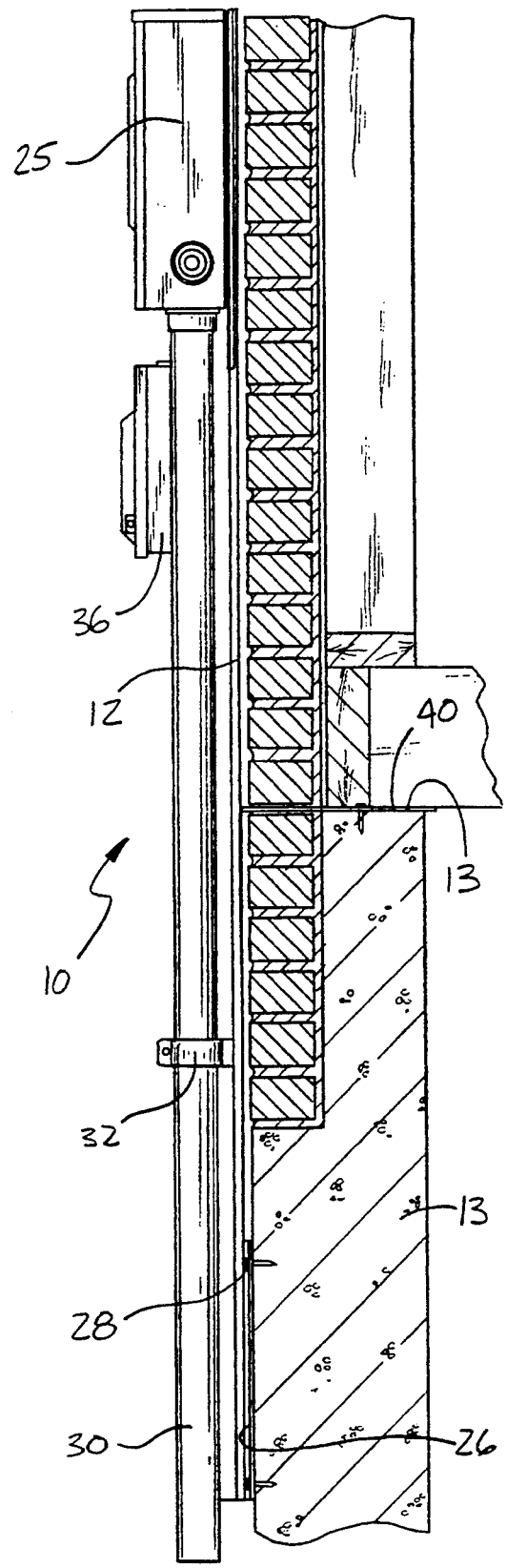
FIG. 5 is side view of the utility meter pedestal of FIG. 3 but with the utility meter box, the temporary outlet box and the utility service conduit and installed on a building foundation with the intermediate bracket anchored to the top surface of the foundation.

As shown in FIG. 3, foundation strap 40 is secured by conventional fasteners to the rear face of post 12 between the meter mounting plate and anchor plate. Strap 40 is preferably formed from an L-shaped length of galvanized steel and comprises a rearwardly extending flat leg which extends over and lies on the top surface of the foundation 13 as best shown in FIG. 5. Several linearly spaced holes 44 may be predrilled in post 12 between ends thereof to permit the foundation strap 40 to be mounted on the rear face of the post in any of several locations to accommodate different foundation dimensions.

Figure 4:
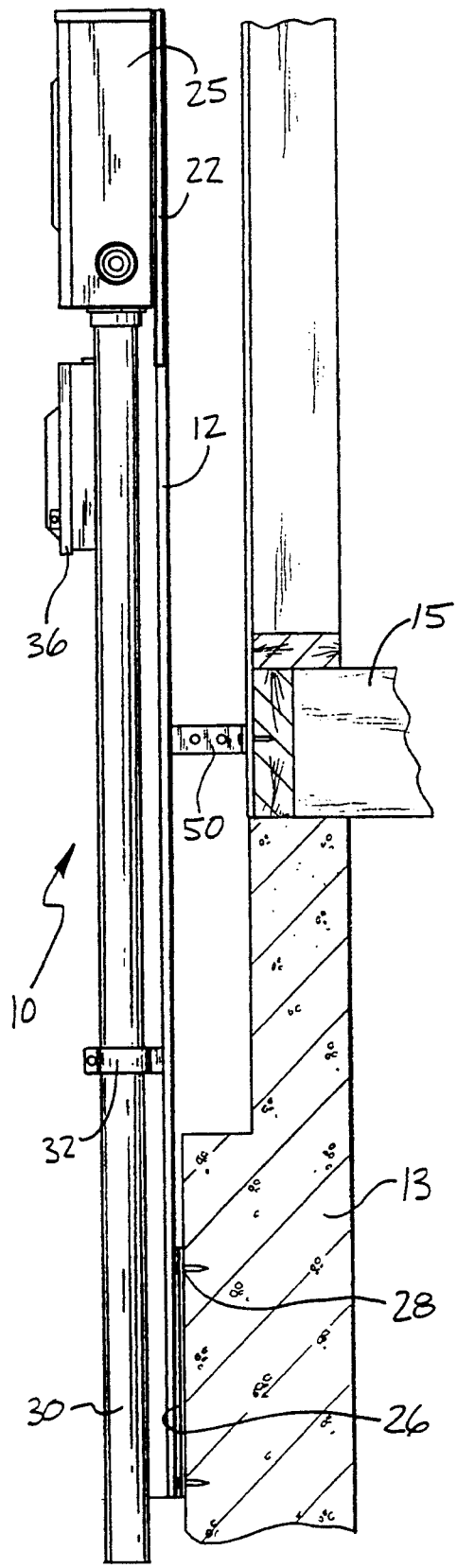
FIG. 4 is a side view of the utility meter pedestal of FIG. 2 installed on a building foundation with the intermediate bracket anchored to a floor joist.

Alternatively, as shown in FIGS. 2 and 4, an adjustable anchor bracket 50 may be used in place of strap 40 when no top surface of the foundation is available such as when the frame of the building has already been completely or partially erected. Bracket 50 comprises an L-shaped length of galvanized steel having one leg attached to the rear face of post 12 and a rearwardly extending leg 53. At least one additional length of L-shaped galvanized steel 54 is fastened to the rearwardly extending leg 53 so that the leg of said additional L-shaped length may be mounted to a floor Joist or outside basement wall of the building. The rearwardly extending leg 53 contains linearly spaced slots to receive fasteners allowing the L-shaped length 54 to be adjustably fastened to the rearward extending leg 53 to accommodate varying dimensions.

In another embodiment of pedestal 10 as shown in FIGS. 6 and 7, the post 12' has a rolled side edge 14' which extends outwardly from and perpendicular to the front face 20' of post 12' and a flanged side edge 16' opposite the rolled side edge which also extends outwardly and perpendicular from the front face 20'. The meter mounting plate 22' has at least one rolled side edge 24' which is adjacent to and rigidly nests within the rolled side edge 14' of the post as best shown in FIG. 7.

The method of installing the pedestal will now be described with reference to all of the figures and with the understanding that FIGS. 4 and 5 represent a typical installation of the device on a foundation having a conventional brick ledge.

The post 12 is first assembled: the meter mounting plate 22 is preferably welded to the front face of post 12 at the factory in the preferred location. Similarly, the anchor plate 26 is secured by fasteners, spot welds or rivets to the rear face of post 12 at the factory. However, it is preferable to secure the anchor plate 26 to the post 12 by bolts 29 so as to permit the selection of either a flat plate (not shown) or the offset plate shown in FIG. 2. The foundation anchor plate 26 is installed in the appropriate set of holes 28 for installation on the foundation 13.

A portion of the foundation 13 below grade is preferably exposed by excavation in the immediate vicinity of the underground utility service line. The installer places the post 12 against the foundation with the post in a vertical orientation; a carpenter's level is preferably used to determine that the post is perfectly vertical in both lateral and fore and aft planes. The plate 26 is flush against the exposed outside face of the foundation 13 usually below grade, and the strap 40 rests on top of the foundation as shown in FIG. 5 or alternative the bracket 50 is secured to the foundation wall or floor joist as shows in FIG. 4. After again checking for the plumb condition, a power-driven nail gun is preferably used to permanently secure the plate 26 and the strap 40 or bracket 50 to the appropriate surfaces of the foundation 13.

Prior to the installation step described above, the back surface of the meter box 25 is secured by threaded fasteners 33 to the front face of the plate 22 through holes 34. Conduit 30 is secured by clamp 32 to the and by plastic coupling 55 to the bottom of the meter box 25 in a conventional manner. If temporary service is to be provided, plate 35 is secured to the flanged side edge 16 of post 12 in any desired location and the outlet box 36 is thereafter secured to the plate 35. The installer threads the electric utility service lines upwardly through conduit 30 and makes the appropriate electrical connections to the meter and to the outlet box 36.

The building which is to be erected on foundation 13 may thereafter progress in the normal fashion without undue interference from the preinstalled condition of the pedestal post 12 and the various accessories thereon.

It is to be understood that the pedestal of present invention may be fabricated from a variety of materials including metals as well as synthetic polymers. Furthermore, the pedestal may be fabricated in configurations other than those shown herein. Thus, it will be appreciated that the foregoing drawings, discussion and description are merely illustrative of the present invention, and not a limitation on the practice thereof. It is the following claims, including all equivalents which define the invention.

I claim:

1. A utility meter pedestal adapted to be mounted to a building foundation comprising:
    an elongated upright post of essentially planar configuration having a front face, a rear face, an upper end, a lower end, and a rolled side edge extending outwardly from and essentially perpendicular to a plane of said post;
    a meter mounting plate secured to said post near said upper end, said plate having a rolled side edge which is adjacent to and in rigid overlapping relationship with said rolled side edge of said post; and
    an anchor plate secured to said post near said lower end and adapted to be mounted to said building foundation.

2. A pedestal as defined in claim 1 wherein said post includes a flange extending along at least a portion of the length of a side edge opposite said rolled side edge, said flange extending outwardly from, and essentially perpendicular to, said plane of said post.

3. The pedestal as defined in claim 2 including a utility meter box secured to said meter mounting plate.

4. The pedestal as defined in claim 2 including an intermediate plate secured to said flange.

5. The pedestal as defined in claim 4 including a utility outlet secured to said intermediate plate.

6. The pedestal as defined in claim 2 including an intermediate bracket secured to said rear face of mind post between ends thereof and extending rearwardly therefrom.

7. The pedestal as defined in claim 6 wherein a rigid flat strap extends rearwardly from said post and is adapted to be secured to the to surface of said building foundation.

8. The pedestal as defined in claim 6 wherein said intermediate bracket includes an L-shaped bracket.

9. A utility meter pedestal adapted to be mounted to a building foundation comprising:
    an elongated upright post of essentially planar configuration having a front face, a rear face, an upper end, a lower end, and a rolled side edge extending outwardly from and essentially perpendicular to a plane of said post;
    a meter mounting plate secured to said post near said upper end, said plate having a rolled side edge which is adjacent to and in rigid overlapping relationship with the rolled side edge of said post;
    a utility meter box secured to said meter mounting plate;
    a flange extending along at least a portion of the length of a side edge opposite said rolled side edge, said flange extending outwardly from, and essentially perpendicular to, said plane of said post;
    an anchor plate secured to said post near said lower end and adapted to be mounted to the building foundation;
    an intermediate bracket secured to said rear face of said post between ends thereof and extending rearwardly therefrom;
    an intermediate plate secured to said flange; and
    a power outlet box secured to said intermediate plate, said power outlet box being electrically connected to said utility meter box.

10. A utility meter pedestal adapted to be mounted to a building foundation comprising:
    an elongated upright post of essentially planar configuration having a front face, a rear face, an upper end, a lower end, and a rolled side edge extending outwardly from and essentially perpendicular to said front face of said post;
    a meter mounting plate secured to said post near said upper end said plate having a rolled side edge which is adjacent to and in rigid nesting relationship with said rolled side edge of said post;
    a utility meter box secured to said meter mounting plate;
    a flange extending along at least a portion of the length of a side edge opposite said rolled side edge, said flange extending outwardly from, and essentially perpendicular to, said plane of said post;
    an anchor plate secured to said post near said lower end and adapted to be mounted to the building foundation;
    an intermediate bracket secured to the rear face of said post between ends thereof and extending rearwardly therefrom;
    an intermediate plate secured to said flange; and
    a power outlet box secured to said intermediate plate, said power outlet box being electrically connected to said utility meter box.

* * * * *

UNITED STATES PATENT AND TRADEMARK OFFICE
CERTIFICATE OF CORRECTION

PATENT NO. : 5,377,074
DATED : December 27, 1994
INVENTOR(S) : Jerry D. Byrd

It is certified that error appears in the above-indentified patent and that said Letters Patent is hereby corrected as shown below:

Column 2, Line 16, Please delete "top-of" and insert -- top of --.

Column 2, Line 23, Please delete "services" and insert --service--.

Column 5, Line 59, Please delete "to said rear face of mind" and insert -- to the rear face of said --.

Signed and Sealed this

Twenty-third Day of May, 1995

Attest:

BRUCE LEHMAN

*Attesting Officer*   *Commissioner of Patents and Trademarks*